(12) United States Patent
Cook et al.

(10) Patent No.: US 8,495,689 B2
(45) Date of Patent: Jul. 23, 2013

(54) SYSTEM AND METHOD FOR PARTIAL PUSH VIDEO ON DEMAND

(75) Inventors: Andrew V. Cook, Lenexa, KS (US); Jade D. Kerr, Kansas City, MO (US); Mohit Mathur, Olathe, KS (US); Michael P. Morrissey, Overland Park, KS (US); Clinton J. Smoyer, Raymore, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 959 days.

(21) Appl. No.: 12/478,354

(22) Filed: Jun. 4, 2009

(65) Prior Publication Data

US 2010/0313227 A1 Dec. 9, 2010

(51) Int. Cl.
*H04N 7/173* (2011.01)
*H04N 7/16* (2011.01)

(52) U.S. Cl.
USPC ............... 725/97; 725/95; 725/103; 725/116; 725/146

(58) Field of Classification Search
USPC .................................. 725/86–103
See application file for complete search history.

(56) References Cited

U.S. PATENT DOCUMENTS

| | | | |
|---|---|---|---|
| 5,357,276 A | 10/1994 | Banker et al. | |
| 5,453,779 A | 9/1995 | Dan et al. | |
| 5,461,415 A | 10/1995 | Wolf et al. | |
| 5,477,263 A | 12/1995 | O'Callaghan et al. | |
| 5,629,732 A | 5/1997 | Moskowitz et al. | |
| 6,018,359 A | 1/2000 | Kermode et al. | |
| 6,543,053 B1 | 4/2003 | Li et al. | |
| 7,080,400 B1 | 7/2006 | Navar | |
| 7,107,606 B2 * | 9/2006 | Lee | 725/87 |
| 7,680,993 B2 | 3/2010 | Douglas | |
| 7,919,979 B1 | 4/2011 | Mason et al. | |
| 2002/0095510 A1 * | 7/2002 | Sie et al. | 709/231 |
| 2005/0022242 A1 | 1/2005 | Rosetti et al. | |
| 2005/0055718 A1 | 3/2005 | Stone | |
| 2007/0032975 A1 | 2/2007 | Mori et al. | |
| 2007/0067484 A1 | 3/2007 | Cheung et al. | |
| 2007/0074258 A1 | 3/2007 | Wood et al. | |
| 2007/0107026 A1 * | 5/2007 | Sherer et al. | 725/97 |
| 2007/0162502 A1 | 7/2007 | Thomas et al. | |
| 2007/0277205 A1 | 11/2007 | Grannan | |
| 2008/0046584 A1 | 2/2008 | Tucker | |
| 2008/0209062 A1 * | 8/2008 | Barrett | 709/231 |

(Continued)

OTHER PUBLICATIONS

Video on Demand, http://en.wikipedia.org/wiki/Video_on_demand Jan. 8, 2009.

(Continued)

*Primary Examiner* — Scott Beliveau
*Assistant Examiner* — Yassin Alata
(74) *Attorney, Agent, or Firm* — Swanson & Bratschun, L.L.C.

(57) ABSTRACT

A system and method of delivering video content over a network in communication with a subscriber having an associated electronic device is disclosed. A plurality of staggered streams of video content is delivered over a network. A segment of the video content is pushed onto the electronic device. A request for the video content is received at the electronic device, the pushed segment of video content is retrieved from the electronic device and the pushed segment of video content is displayed to the subscriber. A staggered stream of video content delivered over network is located and recorded on the electronic device.

20 Claims, 10 Drawing Sheets

U.S. PATENT DOCUMENTS

2008/0288991 A1 11/2008 Smoyer et al.
2008/0307453 A1 12/2008 Haberman
2009/0193486 A1 7/2009 Patel et al.

OTHER PUBLICATIONS

OZ, Ran, "Switched Unicast: It's Not Just About Capacity," BigBand Networks, pp. 1-11.
"Video on Demand," http://en.wikipedia.org/wiki/Video_on_demand, pp. 1-5, printed Jun. 4, 2009.
OZ, Ran, "Switched Unicast: Its Not Just About Capacity," BigBand Networks, pp. 1-11.

U.S. Appl. No. 12/487,163; Non Final Office Action dated Jan. 24, 2012; 19 pages.
U.S. Appl. No. 12/478,404; Notice of Allowance dated Aug. 14, 2012; 17 pages.
U.S. Appl. No. 12/478,404; Final Office Action dated Jan. 12, 2012; 10 pages.
U.S. Appl. No. 12/487,163; Restriction Requirement dated Oct. 20, 2011; 6 pages.
U.S. Appl. No. 12/487,163; Final Rejection dated May 31, 2012; 26 pages.

* cited by examiner

SYSTEM AND METHOD FOR PARTIAL PUSH VIDEO ON DEMAND

BACKGROUND

As technology has developed, so have the ways in which viewers obtain video content. Not long ago, viewers could either watch video broadcast to their television sets or by traveling to the local cinema to watch a motion picture. VHS tapes and DVDs eventually emerged, both of which allowed viewers to watch the video content whenever they chose.

With the development of Internet protocol television (IPTV), communication companies are establishing networks for subscribers to watch video content. Generally, IPTV describes a system where a digital television service is delivered using Internet protocol (IP) over a network. The network used for IPTV may include the public Internet or a private IP network controlled by an IPTV service provider via a broadband connection known as digital subscriber lines (DSL), where the digital subscriber lines typically include conventional telephone lines with copper wire into households. Alternatively, the digital subscriber line may be fiber to the premises (FTTP). Telecommunication service provider companies that have begun offering DSL have limited bandwidth resources, particularly when delivering video over existing copper wire infrastructures.

In additional to television programming, many communications companies offer their subscribers video on demand (VOD) services. FIG. 1 is an illustration of a conventional system 100 that is configured to deliver VOD. As shown, a provider 102 is communicatively connected to a head-end server 106. Server 106 is used to store video content delivered to it from service provider 102. The server 106 is also capable of delivering video content 104 over a network 108, such as the internet or public/private packet switched network (PSN), for example. As shown, server 106 is configured to transmit video content in the form of data packets 104. The server 106 delivers the video content 104 via the network 108 to a DSL access multiplexer (DSLAM) 110. The DSLAM 110 operates to connect subscribers to the network 108, host video streams/ Internet group management protocol (IGMP), and provide Ethernet transport of the video content. The DSLAM 110 further operates as a multiplexer to distribute the video content 104 through communication lines 112a-112n to set top boxes (STB) 114a-114n (collectively 114). Additionally, the DSLAM 110 may also communicate VOD requests from a particular STB 114 to the server 106 via network 108.

Today, VOD typically exists as a unicast video stream, as illustrated in FIG. 1. In a unicast stream set-up, there is one video stream for each subscriber requesting the video content. Therefore, if 100 subscribers request to receive a particular video file, 100 distinct copies of the video are delivered through the system. As shown in FIG. 1, STB A 114a initiated the request for video 104. After STB A 114a requested the video, server 106 initiated the delivery through network 108 and to STB A 114a. As shown, STBs B-N 114b-n did not receive the video. However, if STB B 114b requested the same video only moments after STB A 114a, duplicate copies of the video content 104 would simultaneously be streamed through the network 108. As can be appreciated, delivering video through a unicast video stream can bombard systems and dramatically reduce available system bandwidth when multiple subscribers request video content.

Therefore, service providers have begun to offer video content through a multicast video stream. A multicast video stream is illustrated in FIG. 2. Multicast stream network 200 is similar in most respects to unicast system 100. However, in contrast to the unicast video stream, multicast video streams are delivered to all subscribers connected to the network. As shown in FIG. 2, video 104 is delivered to all STBs 114a-n. In some versions of multicast VOD systems, multiple copies of the same video content are streamed through the network beginning at various intervals (e.g., every 15 minutes). This allows a video service provider to limit the number of video streams for particular video content, thereby limiting the amount of bandwidth dedicated to that video. However, multicast streaming requires the subscribers interested in the video content to begin watching the video content at a set time or at set intervals, which undermines the "on demand" aspect of VOD. Further, a substantial amount of bandwidth is still consumed by typical multicast VOD systems.

Additionally, electronic devices exist on the market that allow users to record video content based on the user's selection criteria. Digital video recorders (DVRs) allow consumers to record digital video content, such as video 104. Some service providers provide as an option to their subscribers the opportunity to lease a DVR from the provider, as opposed to the subscribers purchasing their own.

In light of the above, there exists a need for a system that provides true VOD while minimizing traffic on the network.

SUMMARY

The present invention provides an improved VOD system and method. The claims, and only the claims, define the invention.

The principles of the present disclosure provide a system and method for pushing a segment of video content onto the memory of an electronic device associated with a network subscriber. When the subscriber later selects the video content related to the pushed segment, the subscriber will immediately begin viewing the content from electronic device memory. The electronic device will then locate a staggered multicast stream for that video content and begin to record that stream. When the pushed segment of video content is exhausted, the electronic device will begin presenting the recorded multicast stream to the subscriber. This system and method provides the subscriber with a true VOD experience without generating the amount of network traffic associated with unicast streaming.

In one aspect of the present disclosure, a method of delivering video content over a network in communication with a subscriber having an associated electronic device comprises delivering a plurality of staggered streams of video content over the network, pushing a segment of the video content onto the electronic device, receiving a request for the video content at the electronic device, retrieving the pushed segment of video content from the electronic device and displaying the pushed segment of video content to said subscriber, locating one of the staggered streams of the video content most recently delivered over the network, and recording the one of the staggered streams of the video content delivered over the network on the electronic device.

It is an object of certain embodiments of the present disclosure is to provide an improved VOD system and method.

Further, objectives and advantages of the present invention will appear as the description proceeds.

DETAILED DESCRIPTION OF THE PREFERRED EMBODIMENTS

Figure 1:
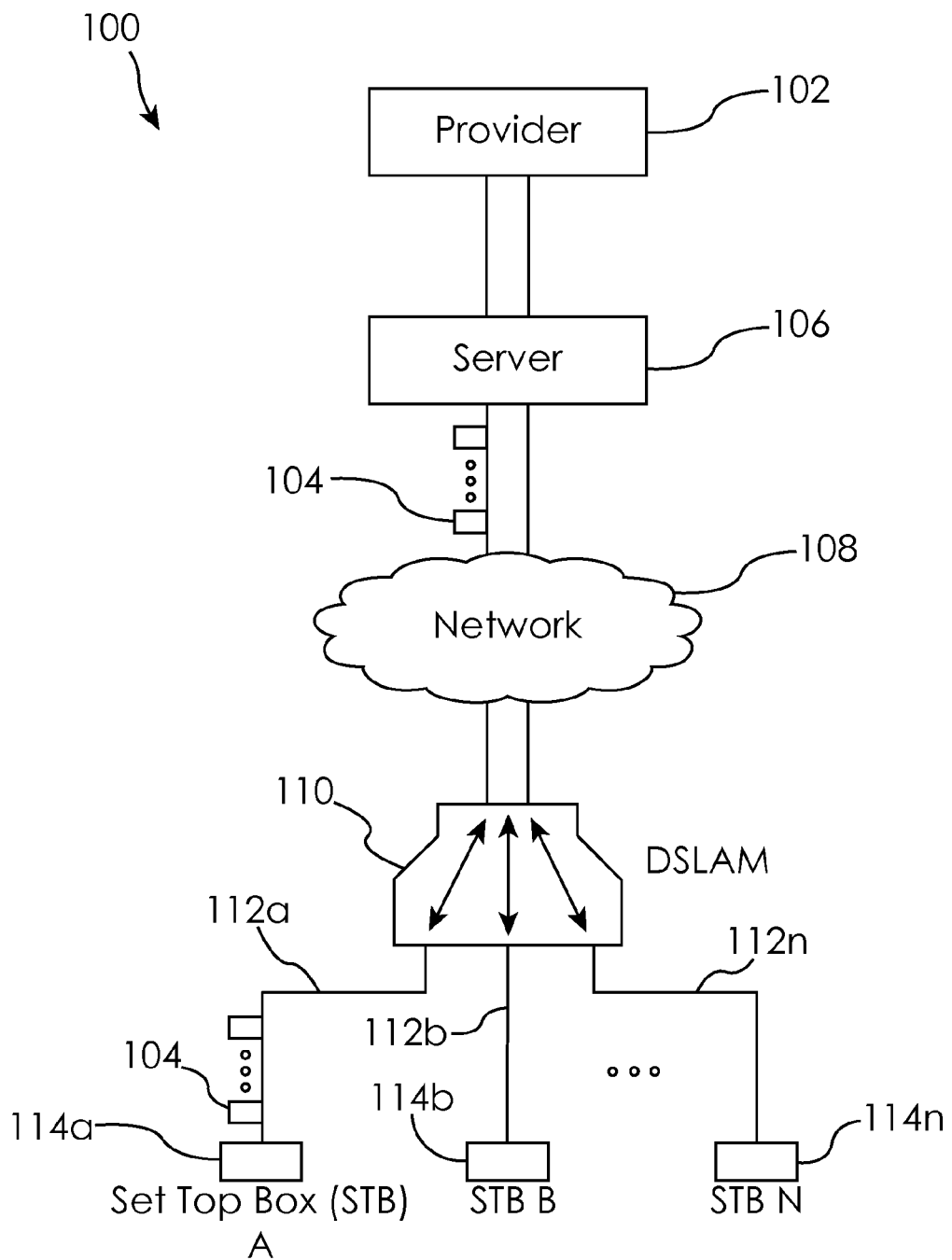
FIG. 1 is an illustration of a conventional system configured to deliver VOD via a unicast stream.
Figure 2:
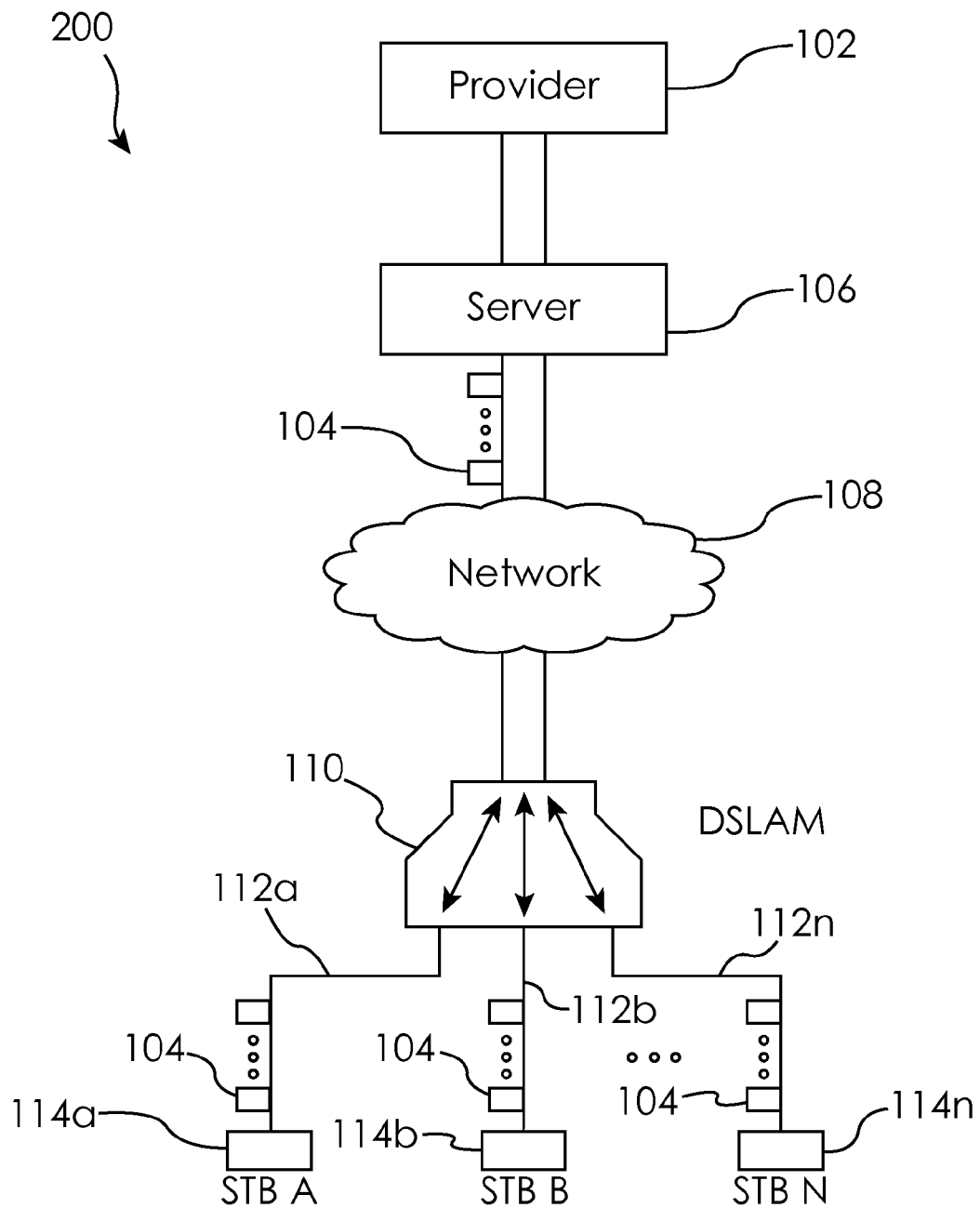
FIG. 2 is an illustration of a conventional system configured to deliver VOD via a multicast stream.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The language used in the claims is to only have its plain and ordinary meaning, except as may be explicitly defined herein. Such plain and ordinary meaning is inclusive of all consistent dictionary definitions from the most recently published Webster's dictionaries and Random House dictionaries.

The principles of the present disclosure provide a system and method for pushing a segment of video content onto the memory of an electronic device associated with a network subscriber. When the subscriber later selects the video content related to the pushed segment, the subscriber will immediately begin viewing the content from electronic device memory. The electronic device will then locate the staggered multicast stream for that video content and begin to record that stream. When the pushed segment of video content is exhausted, the electronic device will begin presenting the recorded multicast stream to the subscriber. This system and method provides the subscriber with a true VOD experience without generating the amount of network traffic associated with unicast streaming.

Figure 3:
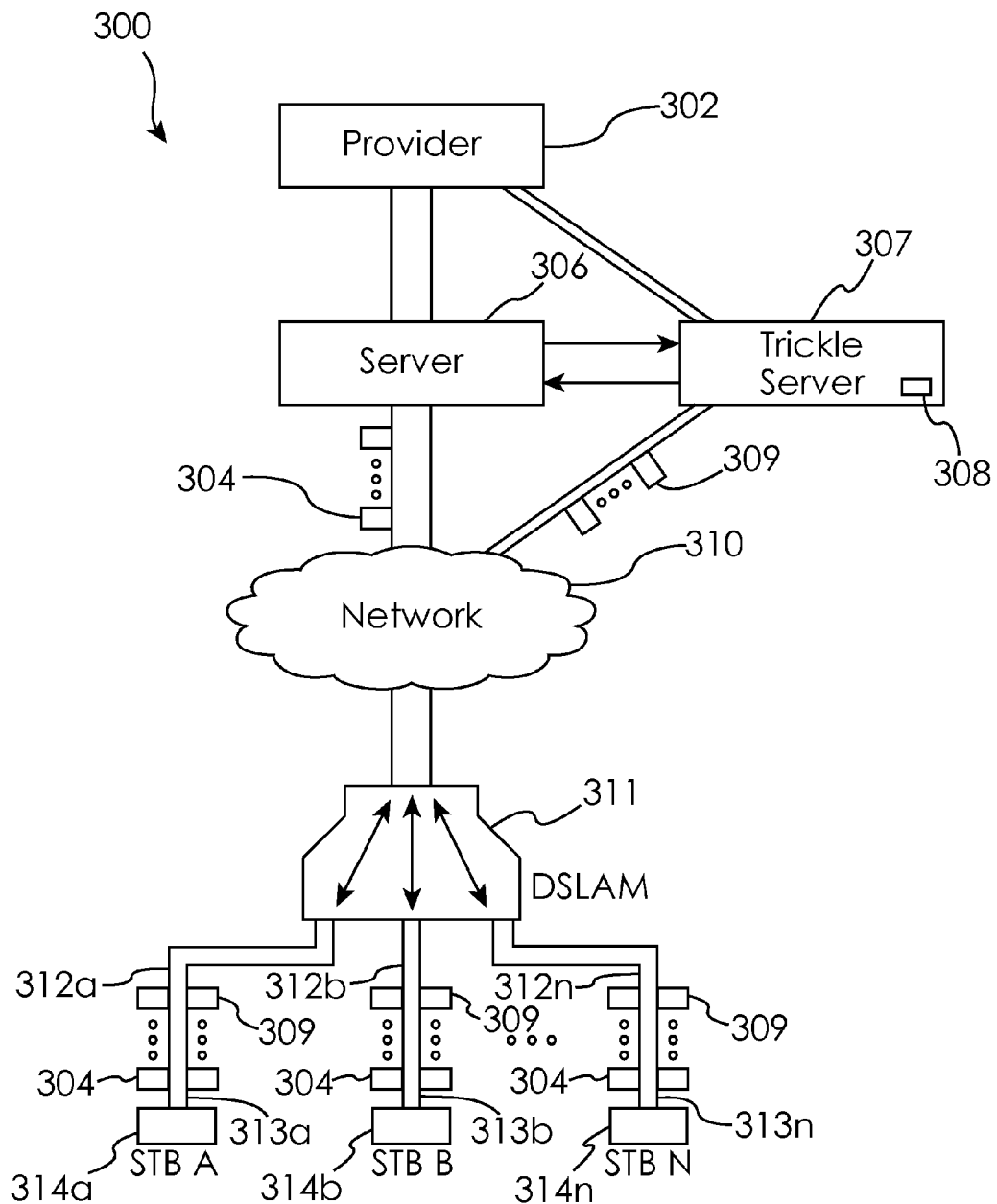
FIG. 3 is an illustration of an exemplary system configured to deliver VOD in accordance with the principles of the present disclosure.

FIG. 3 is an illustration of an exemplary network 300 configured to deliver VOD content to network subscribers in accordance with the principles of the present disclosure. As shown, a service provider 302 is communicatively connected to a head-end server 306, which is communicatively connected to a trickle server 307. A processor 308 is communicatively connected with trickle server 307. Server 306 and trickle server 307 are used to store video content delivered, transferred and/or uploaded to it from provider 302. Server 306 is capable of delivering video content 304 over a network 310, such as the internet or public/private packet switched network (PSN), for example. As shown, server 306 is configured to transmit video content in the form of data packets 304. The server 306 delivers the video content 304 via the network 310 to a DSL access multiplexer (DSLAM) 311. The DSLAM 311 operates to connect subscribers to the network 310, host video streams/Internet group management protocol (IGMP), and provide Ethernet transport of the video content. The DSLAM 311 further operates as a multiplexer to distribute the video 304 through communication lines 312a-312n to set top boxes (STB) 314a-314n (collectively 314). Additionally, the DSLAM 311 may also communicate VOD requests from a particular STB 314 to the server 306 via network 310.

As previously noted, network 300 includes trickle server 307 and processor 308. Trickle server 307 is capable of delivering video content 309 over the network 310. As shown, trickle server 307 is configured to transmit video content in the form of data packets 309. For the sake of clarity, video content 304 is distinguished from video content 309, though the video content of each may relate to the same video or data. However, as used herein, video content 304 represents the video content delivered from server 306 to STBs 314 via multicast streams. Video content 309 represents the video content trickled or pushed to STBs 314 as described herein. Like server 306, trickle server 307 delivers the video content 309 via the network 310 to DSLAM 311. The DSLAM 311 further operates as a multiplexer to distribute the video 309 through communication lines 313a-313n to STBs 314. As shown, communication lines 312 and 313 are shown as distinct lines from DSLAM 311 to STBs 314. In another embodiment, communication lines 312 and 313 may comprise a single data communication line. Processor 308 may be provided within trickle server 307 (as shown) or maintained separately from trickle server 307. As illustrated, trickle server 307 exists as a separate unit from server 306. Alternatively, trickle server 307 and server 306 may form or exist in a single unit.

In accordance with one embodiment of the present disclosure, server 306 distributes video content 304 via a multicast stream. For example, server 306 may stagger streams of "Movie A" in 15 minute intervals. In the known systems, such as multicast network 200, a subscriber wishing to view "Movie A" would either have to wait until the next stagger started or begin watching the most recent stream and miss some of the previously streamed content.

In order to provide the subscriber with a true VOD experience, a segment of video content 309 is slowly streamed to STBs 314 where the segment can be stored. As described above, video content 309 represents the video content, trickled or pushed to STBs 314. Server 306 may communicate with trickle server 307 and/or processor 308 to provide information related to the video content. For example, server 306 may communicate the stagger interval of "Movie A" to trickle server 307 and/or processor 308. Processor 308 may then the determine the appropriate parameters of trickle delivery, such as the time required to push the appropriate segment of "Movie A", the amount of memory on STB 314 required to store the segment of "Movie A", etc.

In one embodiment of the present invention, the service provider 302 may determine to trickle or push a segment of video content 309 only for high-demand or seasonal content. If more subscribers are simultaneously watching the video content than the number of multicast streams, then bandwidth is saved on the network.

In one embodiment of the present invention, the service provider 302 determines a particular trickle rate or bandwidth to push a segment of video content onto STBs 314. The service provider 302 may determine a trickle rate applicable to all video content. Alternatively, the trickle rate may be dependent on the particular video content. The trickle rate may be determined by balancing competing interests. First, the service provider 302 may want the trickle bandwidth to be large enough to push the segment of video onto STB 314 in a reasonable amount of time. Second, the service provider 302 may not want the trickle bandwidth to be so large so as to impede the subscriber's viewing ability. In one embodiment, the trickle bandwidth is determined to be 512 Kbps.

In one embodiment, the service provider, server 306, trickle server 307 and/or processor 308 may periodically determine whether stored segment 309 has been accessed. If the stored segment 309 has gone unused for a specific number of days or weeks, the stored segment 309 may be deleted in accordance with their content contracts. Alternatively, the service provider may allow the subscriber to determine how long the video content is maintained on the electronic device and the subscriber may then delete the video interval 309 to make more memory available for other content.

Figure 4:
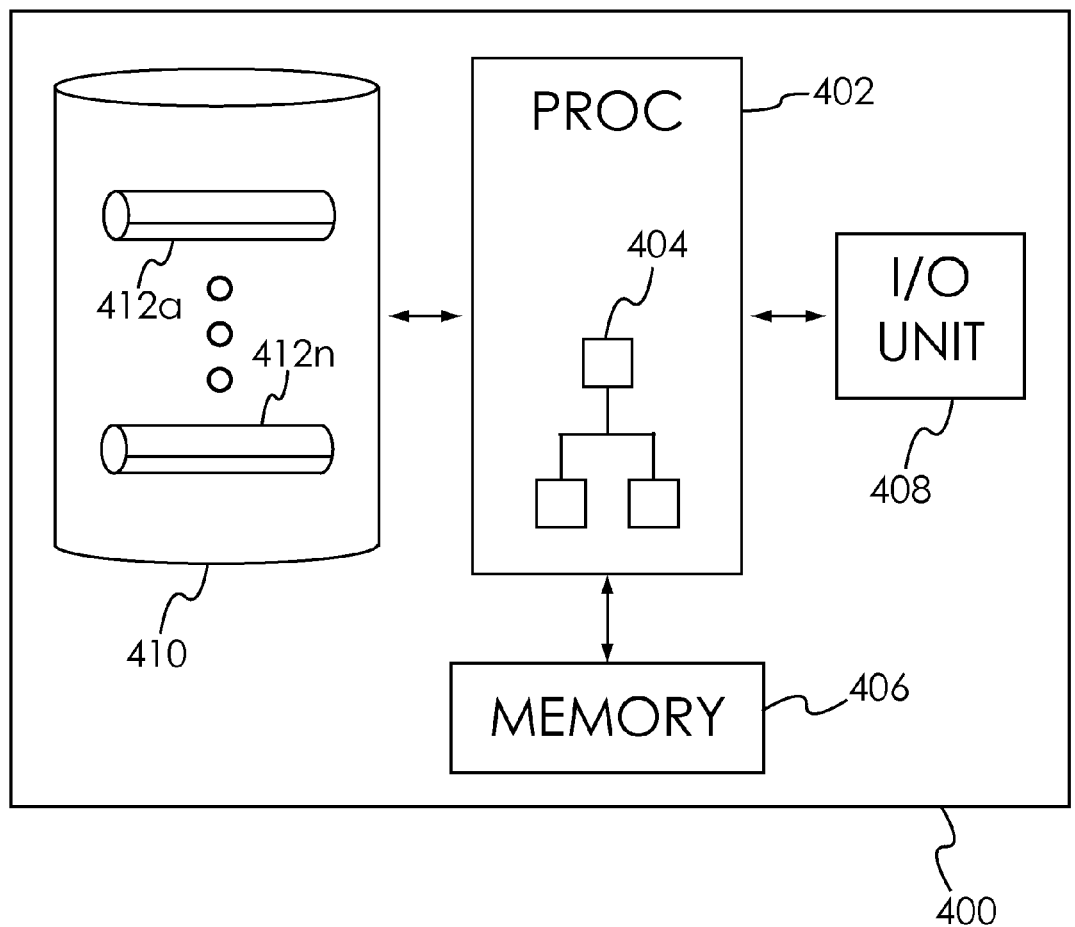
FIG. 4 is a block diagram of an exemplary device utilized to deliver video content to a subscriber.

FIG. 4 is a block diagram of an exemplary system device 400 utilized to deliver video content to an end-user (e.g., subscriber). The device 400 may be generally representative of a number of systems utilized to deliver video content associated therewith to end-users. For example, the device 400 may represent a head-end server 306, trickle server 307 and/or set top box 314. As shown, the device 400 includes a processing unit 402, which may be formed of one or more processors, that executes software 404. The software, depending upon the system functionality, may be configured to store and (i) manage information, such as video content, (ii) manage routing of video streams, (iii) locate and store existing video streams and/or (iv) manage interaction with an end-user to download video programming and images for display on a television or other electronic display.

The processing unit 402 may be in communication with a memory 406. The memory 406 may be a random access memory, flash memory, or any other memory type. The processing unit 402 may also be in communication with an input/output (I/O) unit 408 that is configured to communicate with a television or other electronic display, remote control, network, or other devices, such as digital video disc (DVD), digital video recorder (DVR), or any other local or network located device. The processing unit 402 may additionally be in communication with a storage unit 410 that is configured to store video data files in data repositories 412a-412n (collectively 412).

Figure 5:
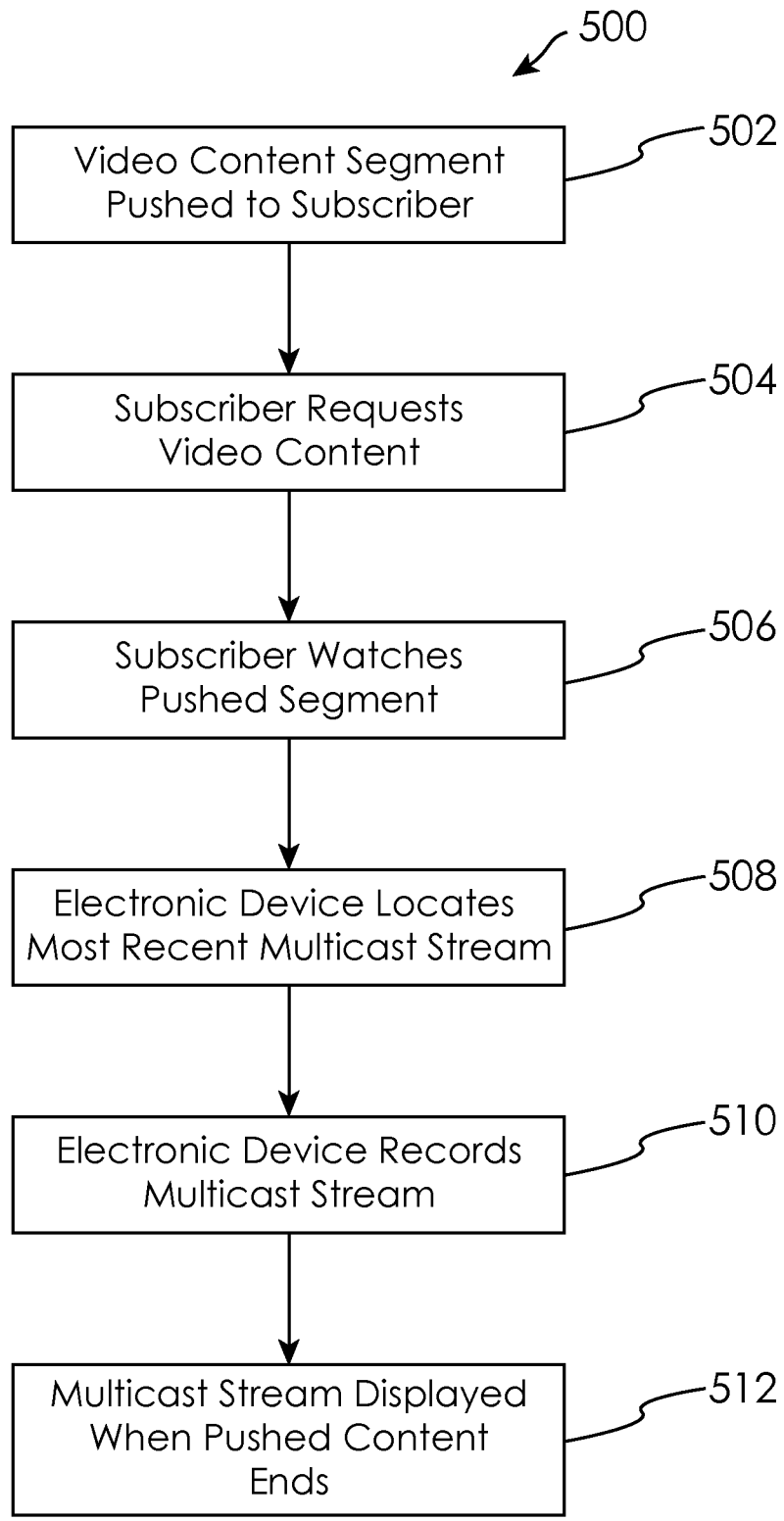
FIG. 5 is a flow chart of an exemplary process of VOD delivery.

FIG. 5 is a flow chart of an exemplary process 500 of system operation for delivering VOD to subscribers. The process 500 starts at step 502, where a video content segment is pushed and stored on an electronic device associated with the network subscribers. In one embodiment, the electronic device may be a STB. In another embodiment, the electronic device may be a DVR. In one embodiment, the length of the pushed segment of video content is dependent upon the time between the staggered streams of the multicast delivery. At step 504, a subscriber requests to view particular video content which is related to the segment of pushed video content. According to one aspect of the present disclosure, the multicast streams delivered by server 306 are hidden from the subscribers. Therefore, the multicast streams may not appear on any program guide viewable by the subscriber.

At step 506, the subscriber's electronic device retrieves the pushed video content interval and the subscriber begins to watch the pushed video segment. At step 508, the electronic device locates the multicast stream that began most recently. Once located, the electronic device begins to record that multicast stream (step 510). According to one aspect of the present disclosure, the subscriber is free to pause, rewind, fast-forward, etc. within the video content that has been received and recorded. The electronic device will continue to record the content from the located multicast stream until it reaches the end of the particular multicast stream. When the electronic device reaches the end of the pushed video content segment, the electronic device will begin to present the recorded multicast stream to the subscriber (step 512). In one embodiment, the electronic device provides a seamless transition between the two sets of recorded data (the pushed segment and recorded multicast stream) and the subscriber is unaware that any transition takes place.

At this point, the entire video content is on the subscriber electronic device. The service provider may choose to allow the subscriber to view the video content for a specific number of days and then have the content expire in accordance with an existing content contract. Alternatively, the service provider may allow the subscriber to determine how long the video content is maintained on the electronic device.

Figure 6:
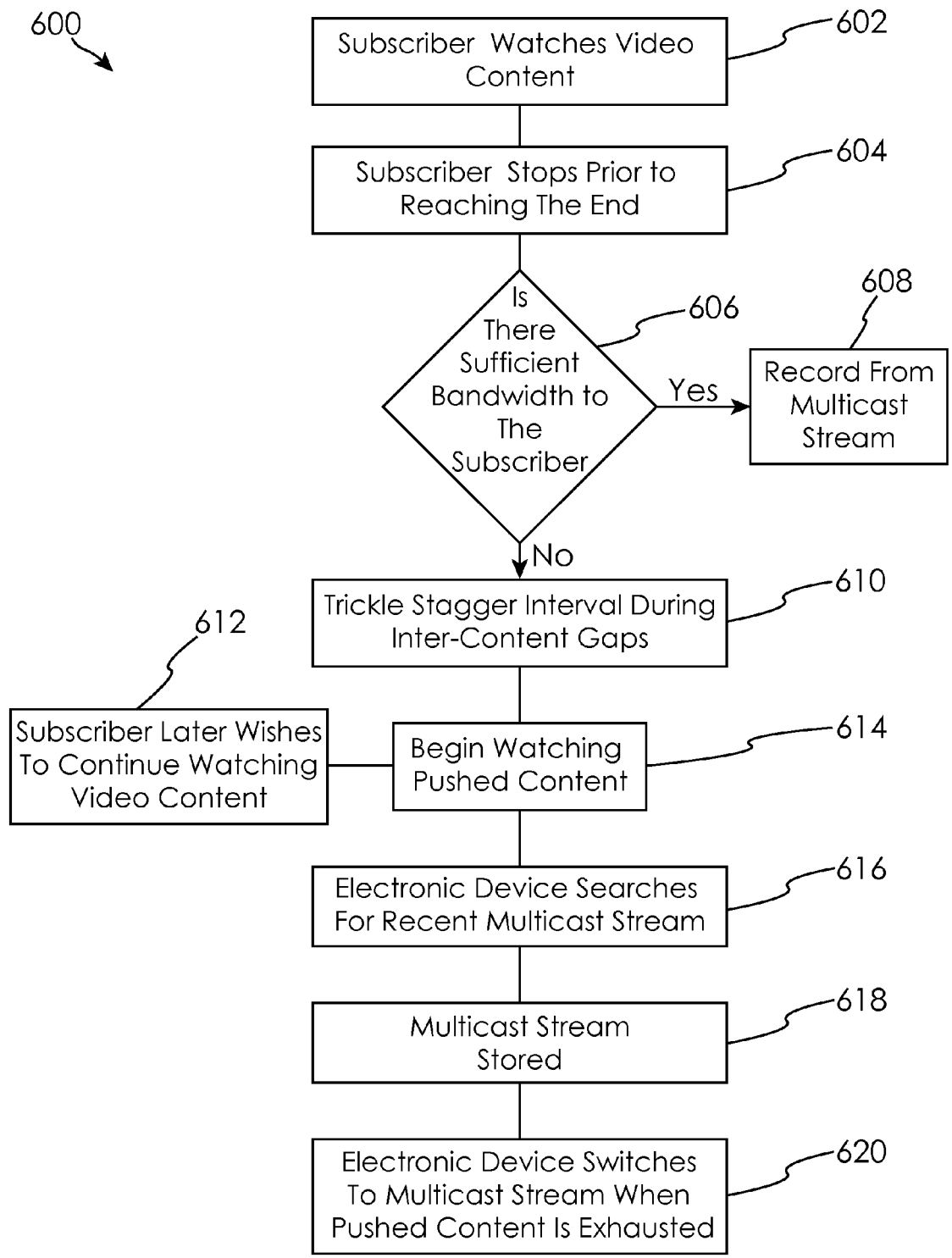
FIG. 6 is a flow chart of a further exemplary process of VOD delivery.

FIG. 6 is a flow chart of a further exemplary process 600 for system operation for delivering VOD to subscribers. The process 600 begins a step 602 where a subscriber is watching particular video content. If the subscriber stops watching the particular video content prior to reaching the end of the content (step 604), the subscriber likely has an expectation to return to the content and pick up where it was left off. To facilitate this, multiple methods may be employed. At step 606, processor 308 of trickle server 307 determines if there is sufficient bandwidth to the subscriber. Alternatively, server 306, trickle serve 307 or another network device may determine whether sufficient bandwidth to the subscriber exists. If there is sufficient bandwidth to the subscriber, the stream may continue to be recorded from the multicast stream by the electronic device associated with the subscriber (step 608). In one embodiment, the remainder of the video content may then be recorded from the multicast stream. In another embodiment, only a segment or portion of the video content is recorded from the multicast stream and stored on the electronic device associated with the subscriber. The length of the recorded segment may be equal to the multicast stagger interval to allow resumption to any multicast stream in the future.

If there is a lack of bandwidth to the subscriber, such as if the subscriber has changed to different video content, a variety of methods may be employed. One option (not illustrated) is that the video content may be continued as a traditional VOD upon resumption, i.e. unicast or multicast. Alternatively, the provider may also leverage the inter-content gaps that are created (if multicast stagger intervals are selected based on integers) to trickle an additional segment of video content to the subscriber (step 610). The length of the pushed segment may be equal to the multicast stagger interval to allow resumption to any multicast stream in the future. When the subscriber later wishes to continue watching the video content (step 612), the subscriber will begin watching the pushed content segment (step 614). At step 616, the electronic device then locates the multicast stream that began most recently. Once located, the electronic device begins to record the multicast stream (step 618). The electronic device will continue to record the content from the located multicast stream until it reaches the end of the multicast stream or the subscriber stops watching the video content. When the pushed content interval is exhausted, the electronic device will begin to present the recorded multicast stream to the subscriber (step 620). In one embodiment, the electronic device provides a seamless transition between the two sets of recorded data and the subscriber is unaware that any transition takes place.

Figure 7:
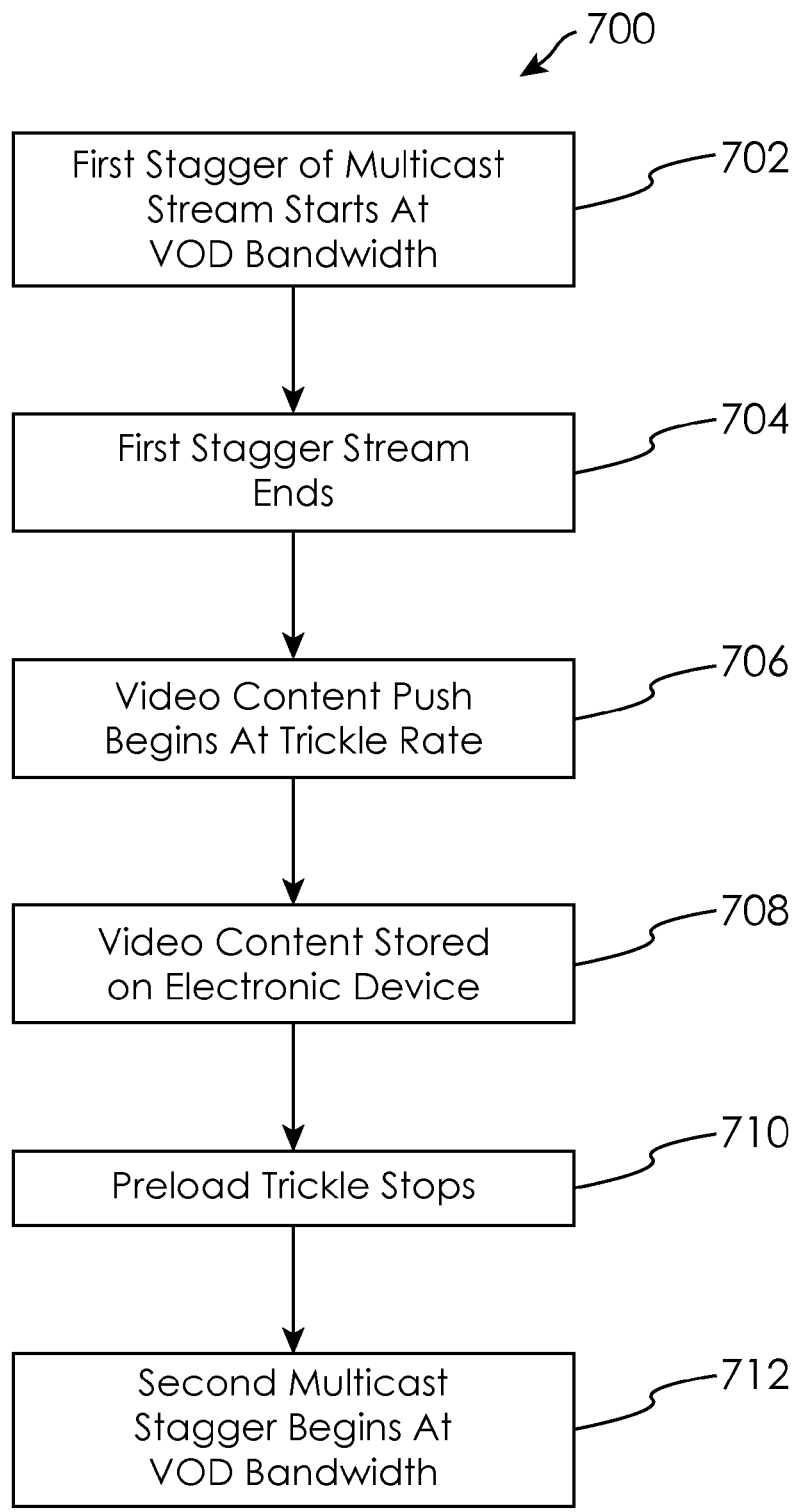
FIG. 7 is a flow chart of another exemplary process of VOD delivery.

As described above, the service provider can use the inter-content gaps to trickle down the segment of video content. The described leveraging of inter-content gaps may be utilized independently of, and need not rely on, the methodology described above. FIG. 7 is a flow chart of another exemplary process 700 for pushing a segment of video content by leveraging inter-content gaps. The process 700 begins at step 702 where server 306 delivers the first staggered stream of a video content on a particular channel via a multicast transmission at a standard VOD bandwidth. At step 704, the first multicast staggered stream ends. At step 706, a segment of video content begins to be delivered from trickle server 307 at the determined trickle rate. In one embodiment, the VOD bandwidth is larger than the trickle rate. The trickled segment of video content is then stored on the electronic devices associated with the network subscribers (step 708). Eventually, the preload trickle is stopped (step 710) to allow the second staggered stream of multicast video content to be delivered in the same channel at the standard VOD bandwidth (step 712). In one embodiment, this process is repeated until a segment of video content is trickled to the subscriber electronic devices having a length equal to the stagger interval between successive multicast streams of the same video content.

Figure 8:
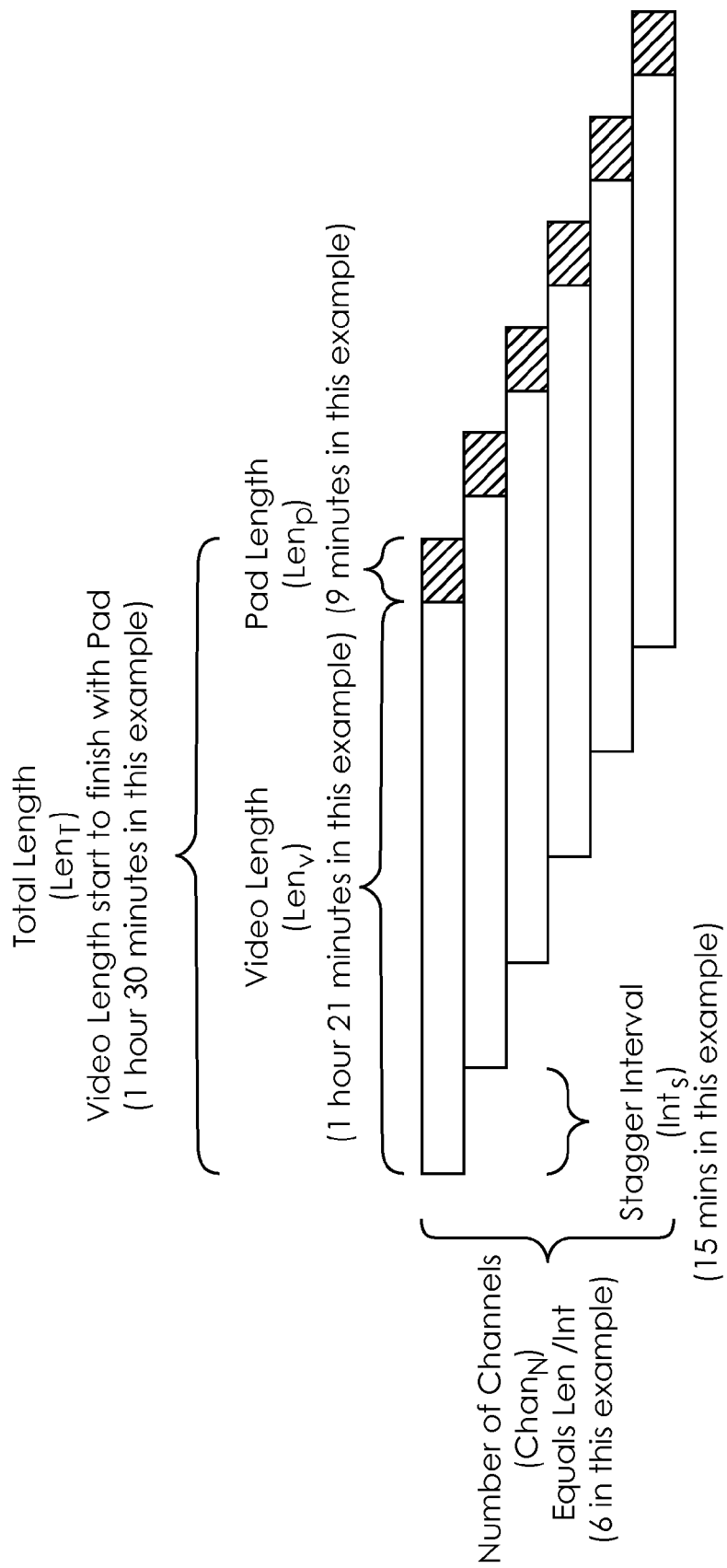
FIG. 8 is an illustration depicting various terms and concepts discussed in the present disclosure.

The service provider may need to be aware of the amount of bandwidth and time required to push the initial preload content to end users and the amount of local storage required. FIG. 8 illustrates the terms and concepts applicable to the present disclosure related to leveraging of inter-content gaps. As used herein, the following definitions apply.

$Len_V$ is the length of the actual video content in seconds.

$Int_S$ is the stagger interval between successive multicast streams of the same content in seconds.

$Len_R$ is the length of content pushed to the subscriber electronic device, which is equal to $Int_S$.

$Len_T$ is the total length of the video plus a pad length and is equal to ($Len_V + Len_P$).

$Chan_N$ represents the number of channels required to stream the same content and is equal to ($Len_T/Int_S$).

$Len_P$ is the buffer added to $Len_V$ required to make $Chan_N$ an integer.

$Rate_E$ is the encoded rate of the video content in bits per second.

$Rate_T$ is the trickle rate available to push content to the subscriber electronic device in bits per second. In one embodiment, $Rate_T$ is slower than the rate the multicast streams of video content are delivered over the network.

$Time_P$ represents the time required to trickle video content of $Len_R$ to the subscriber electronic device and equals (($Rate_E/Rate_T$)*$Len_R$).

$Size_R$ represents the size of content pushed to the subscriber electronic device (8,000,000 assumes power-of-10 storage units) and equals ($Rate_E$*($Len_R$/8000000)).

As described above, it is contemplated that the video content may be delivered to all capable STBs via a multicast stream, by leveraging inter-content gaps, or through use of a dedicated trickle server. To determine the amount of time required to push a preload segment of video content and determine the amount of storage required, the service provider and/or processor 308 of trickle server 307 may take the encoding rate of the content in bits per second, divide that value by the available trickle rate, and then multiply the result by the prerecord length. For this example, powers of 10 are used rather than powers of 2 for Mbps/Kbps for clarity. In this example, the video is encoded at a rate of 8 Mbps and the provider has 512 Kbps available for the trickle rate. As shown in FIG. 8, the length of preload segment ($Len_R$) is 15 minutes. Thus, the trickle server will need (8000000/512000)*15 minutes=234.375 minutes (~3.9 hours) to push the preloaded content onto the subscribers' STBs at a trickle rate of 512 Kbps.

For storage, the push content will require an amount of memory equal to the encoding rate of the content in bits per second, multiplied by the prerecord length times 60 (to convert into seconds). The result is then divided by 8000000 to convert to MBytes (powers of 10 used again). For example, video encoded at 8 Mbps with a 900 second (15 minute) preload segment would result in required storage space of (8000000*900)/8000000=900 MBytes.

The inter-content gap ($Len_P$) is utilized to allow for ease of human readability. In one embodiment, this gap can be set to zero (or extremely small) if stagger times that are non-integer or not multiples of 5 minutes are acceptable. For example, the 121 minute video content in the example could use the same 6 streams with a stagger interval of 13.5 minutes (121/6) with no padding. Though such a stagger may reduce the preload time and storage requirements, the non-integer stagger may make it difficult to present on existing scheduling infrastructure.

Figure 9:
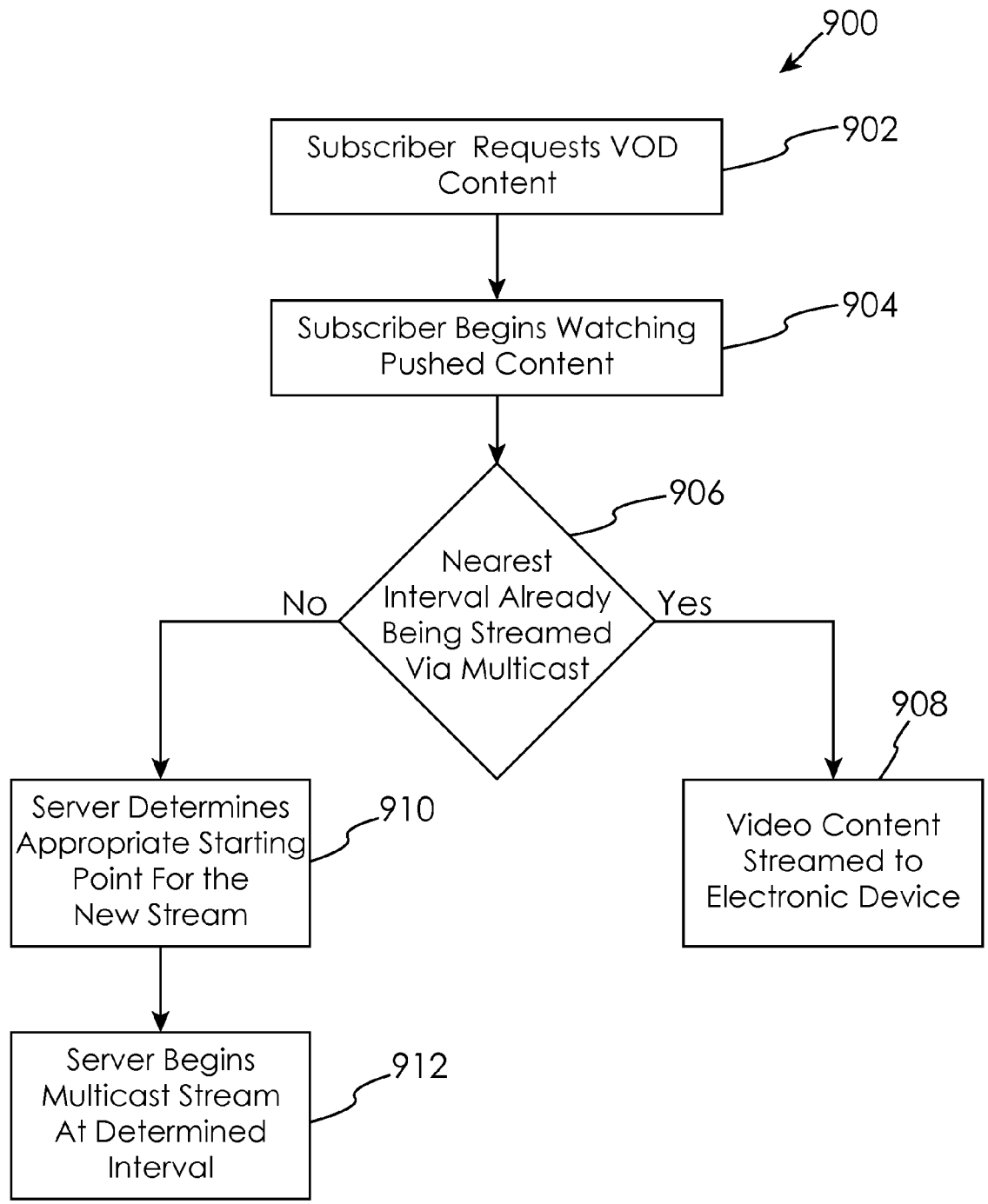
FIG. 9 is a flow chart of a further exemplary process of VOD delivery.

FIG. 9 is a flow chart of a further exemplary process 900 for system operation for dynamically delivering VOD to subscribers. The process 900 begins a step 902 where a subscriber requests particular video content. An electronic device associated with the user retrieves the pushed segment of video related to the particular video content and the subscriber begins to watch the pushed segment (step 904). At some point before the subscriber reaches the end of the pushed segment of video content, a network device determines if the nearest video interval is already being streamed (step 906). In one embodiment, the network device is the electronic device associated with the subscriber. In another embodiment, the network device is a network server. If the nearest video interval is already being streamed, the video content is streamed to the electronic device as described herein (step 908).

If the nearest interval of video content is not being streamed, the network server determines the appropriate starting point for a new multicast stream of video content (step 910). At step 912, the server then begins the multicast stream at the determined interval, which is received by the electronic device. In this embodiment, the server exhibits the ability to "stitch" in the appropriate multicast stream that the subscriber is requesting and enables the service provider the ability to dynamically allocate multicast channels. For example, if a subscriber is watching the first 15 minutes of video content that has been pushed to his/her electronic device and is nearing the end of that segment, the server needs to be aware of the impending requirement for the subscriber to join a multicast stream. Accordingly, the server needs to then begin streaming the appropriate multicast transmission at the determined interval to provide the subscriber with the video content at the correct time. To that end, the server tracks the pre-scheduled start times for all streamed content regardless of whether the streams are viewed or not.

Figure 10:
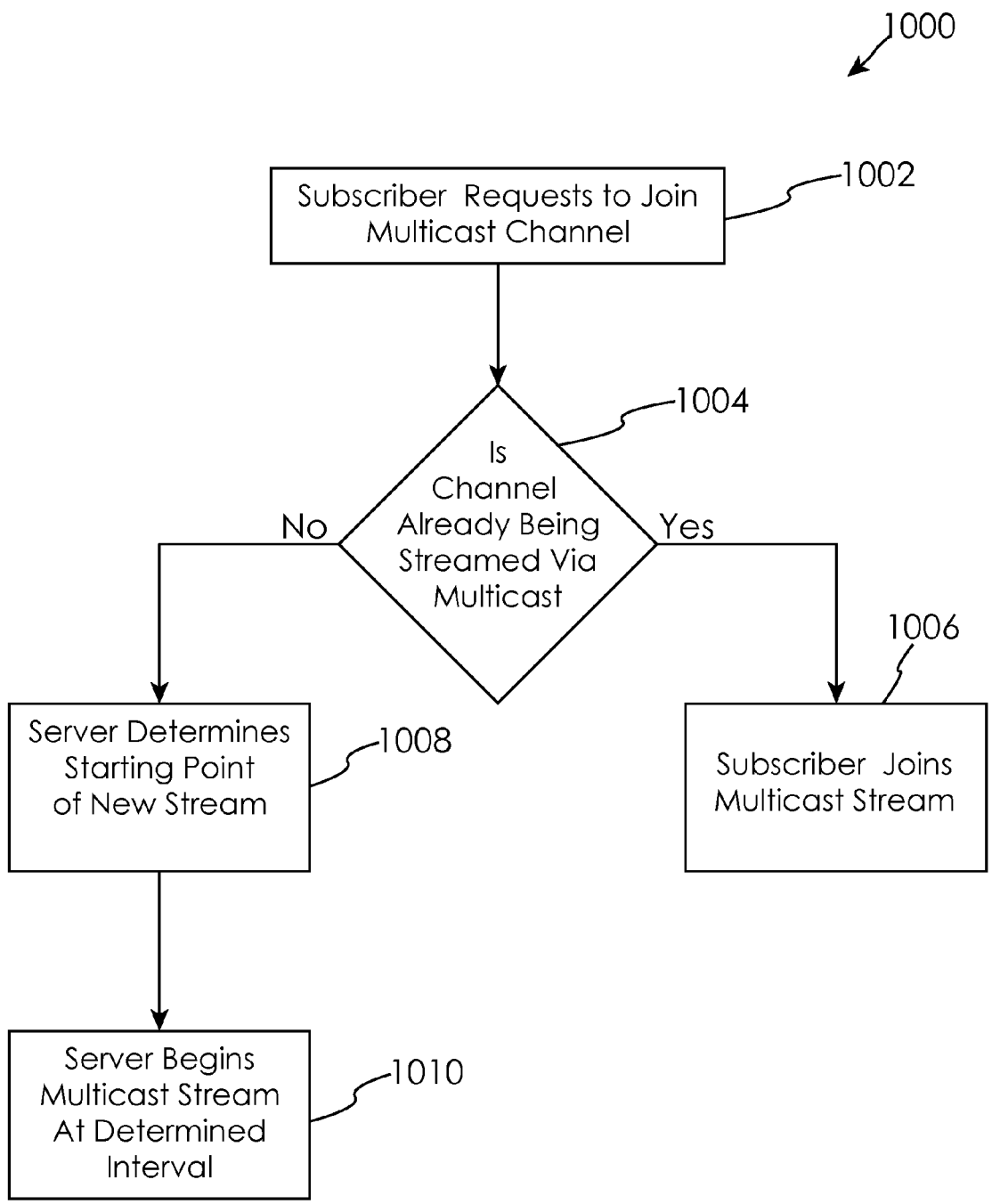
FIG. 10 is a flow chart of yet another exemplary process of VOD delivery.

FIG. 10 is a flow chart of exemplary process 1000 for system operation for dynamically delivering VOD to subscribers. Unlike process 900, process 1000 does not rely on video content being pushed to a subscriber electronic device. However, like process 900, process 1000 allows the service provider to dynamically allocate channels, thereby enabling the service provider to possibly save valuable network bandwidth. Process 1000 begins at step 1002 where a subscriber requests to join a multicast channel. A network device determines if the channel is already being streamed via multicast transmission (step 1004). If so, the subscriber joins the multicast stream (step 1006).

If the channel is not already being streamed, the network server determines the appropriate starting point for a new multicast stream of video content (step 1008). At step 1010, the server then begins the multicast stream at the determined interval, which the electronic device joins. In this embodiment, if the first viewer begins to watch a particular multicast stream in the middle of what would otherwise be a movie in progress, the server will begin that stream as though it had been playing all along. In one embodiment, the server tracks the pre-scheduled start times for all streamed content and starts the content "in-progress" if the first viewer joins the stream after it had been scheduled to start. For example, a multicast stream may have a pre-scheduled start time of 8:00 pm. If a subscriber joins that stream at 8:12 pm, the server will begin streaming the video content as if the stream had actually started at 8:00 pm.

The disclosed dynamic channel allocation, processes 900 and 1000 being two examples, can save network bandwidth by reducing the number of multicast streams not being viewed by subscribers. For example, if a 120 minute movie is broken into 8 staggered multicast streams, each beginning in 15 minute intervals, those 8 channels will occupy 64 Mbps of bandwidth on the network regardless of whether 1 subscriber or 300 subscribers are watching all 8 streams. By dynamically allocating multicast channels, if only four of the 8 multicast channels are actually being viewed by subscribers, then only four streams are actually transmitted and the network bandwidth for the particular video content is effectively cut in half.

In one embodiment, the disclosed methodology is limited to those STBs leased by the provider to the subscribers. Accordingly, server 306 may verify that STBs 314 of FIG. 1 are the property of the provider 302 instead of the individual subscriber.

Although the principles of the present disclosure have been described in association with set top boxes, it should be understood that the set top box functionality may be incorporated into a television or network and use the principles of the present disclosure in the same or similar manner.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A method of delivering video content over a network in communication with a subscriber having an associated electronic device, said method comprising the steps of:
    delivering a plurality of staggered streams of first video content over said network, each of said streams having a first length;
    pushing a segment of said first video content onto said electronic device, said pushed segment having a second length which is less than said first length;
    receiving a first request for said first video content at said electronic device;
    retrieving said pushed segment from said electronic device and displaying said pushed segment content to said subscriber;
    locating one of said staggered streams delivered over said network; and
    recording said one of said staggered streams on said electronic device;
    in response to the subscriber stopping watching the video content prior to reaching an end of the video content, determining whether sufficient bandwidth to the subscriber exists to continue recording the video content;
    in response to determining that sufficient bandwidth exists, continuing to record on said electronic device a second segment of a remainder of the video content from said one of said staggered streams, the second segment of the remainder of the video content being sufficient to allow resumption of a multicast stream in the future; and
    in response to determining that insufficient bandwidth exists, pushing the second segment of the remainder of the video content from a trickle server to the electronic device.

2. The method of claim 1, further comprising the step of displaying said recorded staggered stream to said subscriber when said pushed segment ends.

3. The method of claim 1, further comprising the steps of providing a first server and a second server, wherein said plurality of staggered streams are delivered by said first server, and said pushed segment is pushed by said second server.

4. The method of claim 1, wherein said plurality of staggered streams are delivered over said network at a first rate, and said pushed segment is pushed at a second rate.

5. The method of claim 4, wherein said first rate is faster than said second rate.

6. The method of claim 1, further comprising the steps of:
    delivering a first stream of said plurality of staggered streams over said network on a channel; and
    delivering a second stream of said plurality of staggered streams over said network on said channel, wherein said first stream stops being delivered at a first time, said second stream begins being delivered at a second time, and said pushed segment is pushed to said electronic device between said first time and said second time.

7. The method of claim 6, wherein said first stream and said second stream are delivered over said network at a first rate, and said pushed segment is pushed at a second rate.

8. The method of claim 7, wherein said first rate is faster than said second rate.

9. The method of claim 1, wherein said electronic device is a DVR.

10. The method of claim 1, further comprising the steps of:
    receiving a second request for a second video content at said electronic device; and
    determining the available bandwidth capacity of the network lines associated with said electronic device.

11. The method of claim 10, wherein said electronic device continues to record said one of said staggered streams delivered over said network on said electronic device after said second request for said second video content is received.

12. The method of claim 11, wherein said electronic device records a remainder of said one of said staggered streams.

13. The method of claim 11, wherein said electronic device records a portion of said one of said staggered streams.

14. The method of claim 13, wherein said portion has a third length defined by the difference in delivery start times between a first stream and a second stream of said plurality of staggered streams.

15. A system for delivering video content to a subscriber, said system comprising:
    a video server in communication with a video distribution network, said video server configured to deliver a plurality of streams of video content over said video distribution network;
    a trickle server in communication with said video distribution network, said trickle server configured to deliver video content over said video distribution network;

an electronic device in communication with said video distribution network, said electronic device configured to receive and store video content from said trickle server; and a processor in communication with said trickle server and said video server, said processor configured to:

receive information related to a particular video and process said information to determine parameters for pushing a segment of said particular video to said electronic device;

in response to the subscriber stopping watching the video content prior to reaching an end of the video content, determine whether sufficient bandwidth to the subscriber exists to continue recording the video content;

in response to determining that sufficient bandwidth exists, continue to record on said electronic device a second segment of a remainder of the video content from said one of said staggered streams, the second segment of the remainder of the video content being sufficient to allow resumption of a multicast stream in the future; and in response to determining that insufficient bandwidth exists, push the second segment of the remainder of the video content from the trickle server to the electronic device.

16. The system of claim 15, wherein said video server is configured to deliver a first stream of said plurality of streams over said network on a first channel, said first stream begins being delivered at a first time, said video server is configured to deliver a second stream of said plurality of staggered streams over said network on a second channel, said second streams begins being delivered at a second time, and said information comprises a stagger interval of time defined by the difference between said first time and said second time.

17. The system of claim 15, wherein said parameters include a time required to push said segment of said particular video onto said electronic device.

18. The system of claim 15, wherein said parameters include an amount of memory on said electronic device required to store said segment of said particular video.

19. The system of claim 15, wherein said electronic device is a set top box.

20. The system of claim 19, wherein said set top box is a DVR.

* * * * *